(12) United States Patent
Thoma

(10) Patent No.: US 10,890,599 B2
(45) Date of Patent: Jan. 12, 2021

(54) DEVICE FOR MEASURING THE SPEED OF A MOVING VEHICLE

(71) Applicant: Marc Thoma, L'Abergement (CH)

(72) Inventor: Marc Thoma, L'Abergement (CH)

( * ) Notice: Subject to any disclaimer, the term of this patent is extended or adjusted under 35 U.S.C. 154(b) by 24 days.

(21) Appl. No.: 16/082,406

(22) PCT Filed: Mar. 6, 2017

(86) PCT No.: PCT/IB2017/051292
§ 371 (c)(1),
(2) Date: Sep. 5, 2018

(87) PCT Pub. No.: WO2017/153890
PCT Pub. Date: Sep. 14, 2017

(65) Prior Publication Data
US 2019/0086441 A1     Mar. 21, 2019

(30) Foreign Application Priority Data

Mar. 7, 2016   (CH) ...................................... 0293/16

(51) Int. Cl.
*G01P 5/02*     (2006.01)
*G01P 13/02*    (2006.01)
*G01F 1/28*     (2006.01)

(52) U.S. Cl.
CPC ................. *G01P 5/02* (2013.01); *G01F 1/28* (2013.01); *G01P 13/02* (2013.01)

(58) Field of Classification Search
None
See application file for complete search history.

(56) References Cited

U.S. PATENT DOCUMENTS

| 2,061,189 A | 11/1936 | Dungan |
| 8,783,604 B2 * | 7/2014 | Sanderson ................ B64C 3/56 244/49 |

(Continued)

FOREIGN PATENT DOCUMENTS

| DE | 697588 C | 10/1940 |
| FR | 2768520 A1 | 3/1999 |
| WO | 2006131954 A1 | 12/2006 |

OTHER PUBLICATIONS

International Search Report; European Patent Office; International Application No. PCT/IB2017/051292; dated May 12, 2017; 3 pages.

(Continued)

*Primary Examiner* — Natalie Huls
*Assistant Examiner* — Jermaine L Jenkins
(74) *Attorney, Agent, or Firm* — Taft Stettinius & Hollister LLP

(57) ABSTRACT

The invention relates to a mechanical device for measuring the relative speed of a vehicle in motion with respect to a fluidic medium, including an attachment member attached to the vehicle so that it can be arranged in a frontal zone of the vehicle, in the direction of travel of the vehicle, and in the fluidic medium in which the vehicle is evolving, wherein the mechanical device is a variable-geometry device, and is designed to occupy, between a folded rest position and a completely deployed extreme service position, at least one intermediate position, and in that each intermediate position of the mechanical device is determined by aerodynamic forces acting on various successive sections that together constitute at least one wing attached or articulated to the attachment member. The invention further relates to a vehicle including the mechanical device.

14 Claims, 3 Drawing Sheets

(56) References Cited

U.S. PATENT DOCUMENTS

| | | | | |
|---|---|---|---|---|
| 9,481,450 B2* | 11/2016 | Pitt | ............................ | B64C 3/52 |
| 9,902,487 B2* | 2/2018 | Alley | ........................ | B64C 11/28 |
| 10,035,579 B2* | 7/2018 | Iglesias | .................... | B63B 41/00 |
| 10,494,081 B2* | 12/2019 | Alley | .......................... | B64C 5/12 |
| 10,730,570 B2* | 8/2020 | Hurst | ...................... | B62D 37/02 |
| 2007/0034001 A1 | 2/2007 | Hutson, Jr. et al. | | |

OTHER PUBLICATIONS

Written Opinion of the International Searching Authority; European Patent Office; International Application No. PCT/IB2017/051292; dated May 12, 2017; 8 pages.

* cited by examiner a)

b)

c)

d)

DEVICE FOR MEASURING THE SPEED OF A MOVING VEHICLE

CROSS REFERENCE TO RELATED APPLICATIONS

This application is a U.S. national stage filing of International Patent Application No. PCT/IB2017:1051292 filed Mar. 6, 2017, which claims priority to Swiss Patent Application No. 00293/16 filed Mar. 7, 2016, the contents of each application hereby incorporated by reference in their entirety.

TECHNICAL FIELD

The present invention relates to a means for measuring the speed of a vehicle (motorbike bicycle, car, motorboat or sailboat, airplane or other) which is embodied by the movement visible to the driver, of a device which moves as a result of changes to the aerodynamic forces associated with the speed of said vehicle. Parts of the device, which are sensitive to aerodynamic forces, move upward of a certain speed, because these forces are enough to overcome retracting forces obtained, for example, by non-linear springs.

TECHNICAL BACKGROUND

Present-day speedometers are based on a measurement of the rotational speed of wheels (cars, motorbikes, bicycles) or propellers (boats) or even, in the case of an airplane, on the difference between the static and dynamic pressures (Pitot tube). The measured speed is generally visible in the form of a display which is either a pointer against a graduated dial, or a figure for a digital display.

SUMMARY OF THE INVENTION

The present invention therefore seeks to overcome the disadvantages of the prior art by proposing an attractive and fun way of measuring the speed of a vehicle in motion.

To this end, the invention relates to a mechanical device for measuring the relative speed of a vehicle ion motion with respect to a fluidic medium composing means of attachment to such a vehicle so that it can be arranged in a frontal zone of said vehicle, in the direction of travel of said vehicle, and in the fluidic medium in which said vehicle is evolving, characterized in that said mechanical device is a variable-geometry device and designed to occupy, between a folded rest position and a completely deployed extreme service position, at least one intermediate stable or transition position, and in that each intermediate position of said device is determined by aerodynamic lift of various successive sections that it comprises and which together constitute at least one wing attached or articulated to said attachment means.

In one particular embodiment, the device is articulated so as to adopt a plurality of intermediate positions between which position-changing thresholds each correspond to a predetermined and precalibrated speed of a moving body with respect to the particular fluidic medium in which said device is intended to evolve, and in that it comprises at least one articulation or flexing zone between two said successive sections, allowing relative movement of one of the two said sections with respect to the other when they are subjected to resultants of different lift forces.

In one particular embodiment, the device comprises at least one mechanical articulation constituting one said articulation zone of said device.

In one particular embodiment the device composes at least one zone that is more flexible than two sections adjacent to it, said more flexible zone constituting one said flexing zone of said device.

In one particular embodiment, the device comprises a plurality of articulation or flexing zones, each one of said articulation or flexing zones being arranged between two successive sections.

In one particular embodiment, the articulation or flexing zone furthest away from said attachment means is designed to allow the distal section, furthest away from said attachment means, to deploy at a relative speed that is lower than the relative speed of deployment of the immediately adjacent section on the side of said attachment means.

In one particular embodiment, each said articulation or flexing zone is designed to allow the section furthest away from said attachment means that it supports on an outward first side to deploy, at a relative speed that is lower than the relative speed of deployment of the immediately adjacent section that it supports on an inward second side, on the side of said attachment means.

In one particular embodiment, at least one said articulation or flexing zone is couples to elastic retracting means designed to tend to return said device toward said folded rest position when the relative speed decreases.

In one particular embodiment, each said articulation or flexing zone is coupled to elastic retracting means designed to tend to return said device toward said folded rest position when the relative speed decreases.

In one particular embodiment said elastic retracting means exert a variable retracting torque between said attachment means and the distal end of said wing.

In one particular embodiment, the device comprises a plurality of wings each one attached or articulated to said attachment means which are common to said plurality of wings.

In one particular embodiment each wing is designed for a particular range of relative speeds.

In one particular embodiment, said wings are arranged in pairs which are symmetric about a longitudinal plane passing through a straight line corresponding to the mean forward trajectory of said vehicle.

In one particular embodiment, the device comprises at least one sensor sensing the change in position of one said section, said sensor being designed to communicate with control and/or display means that said device or vehicle on which said device is installed comprises. The invention further relates to a vehicle designed to travel in a fluidic medium, characterized in that it comprises accommodation means designed to accommodate said attachment means of such a device, said accommodation means being arranged in a frontal zone of said vehicle, in the direction of travel of said vehicle, and m the fluidic medium in which said vehicle evolves.

In one particular embodiment, the vehicle comprises, fixed by means of its said attachment means to said accommodation means, at least one such device.

In one particular embodiment, the vehicle comprises at least one device with at least one sensor as described hereinabove, and it comprises control and/or display means designed to process at least one information received from said sensor and convert it in order to communicate visual and/or audible information to a user of said vehicle.

BRIEF DESCRIPTION OF THE DRAWINGS

Further features and advantages of the present invention will become apparent from the following description of a number of exemplary embodiments of a vehicle's speed measurement device according to the present invention which are given for the sake of illustration and without limitation, with reference to the attached drawings in which.

DETAILED DESCRIPTION OF THE INVENTION

Figure 1:
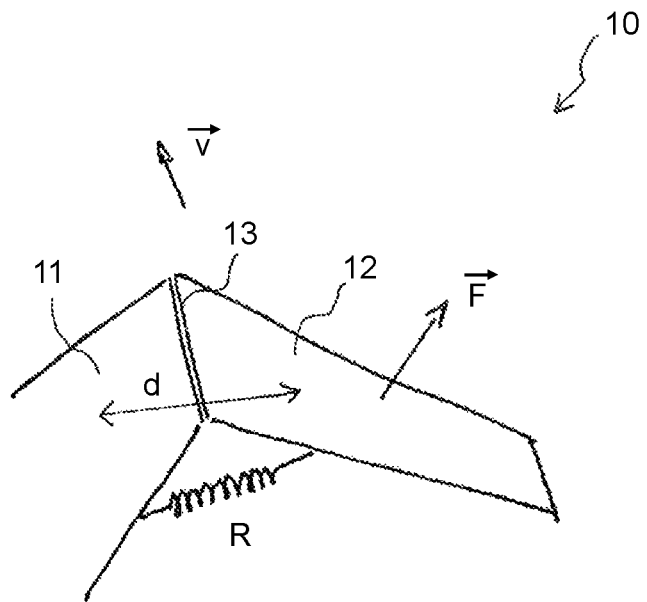
FIG. 1 illustrates a wing portion formed by a speed measuring device according to the present invention.
Figure 2:
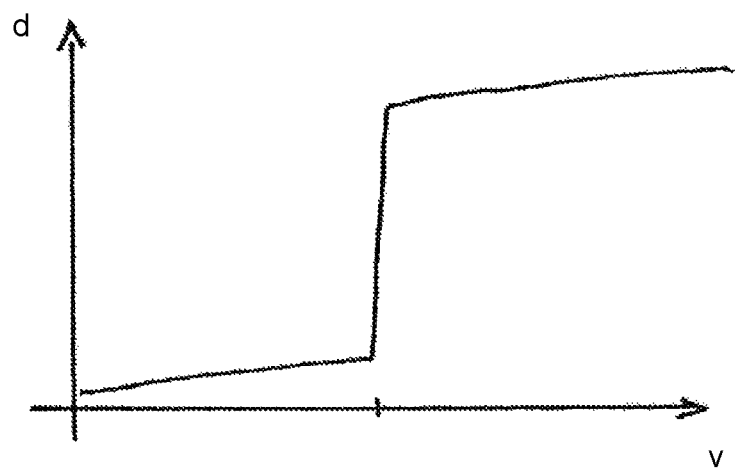
FIG. 2 is a graphic depiction of the change of distance d as a function of speed v in the exemplary embodiment of FIG. 1.
Figure 3:
FIGS. 3a to 3d illustrate a first exemplary embodiment of the speed measuring device of the present invention in several successive positions of deployment.
Figure 3:
Figure 3:
Figure 3:

Reference is made to FIG. 1 which depicts a wing portion formed by a speed measuring device 10 according to the present invention. This wing portion is among other things formed of two adjacent segments 11 and 12 joined together in pivoting manner at an articulation zone 13. Each of the segments 11, 12 has a specific shape and is carefully positioned with respect to the speed vector v to which the wing portion is subjected in the fluidic medium in which it evolves. This shape and arrangement determine the aerodynamic forces and in particular, the lift F to which the segments 11 and 12 are subjected and which tend to bring the wing portion into a deployed position. The segments 11 and 12 are moreover joined together by a retracting means R of the non-linear spring type, said retracting means R tending to return the wing portion to a non-deployed initial position. Thus, the lift forces F on the wing segments, combined with the retracting force exerted by the retracting means R is suitably calculated to allow the wing portion to deploy at a determined speed. This deployment in particular leads to an increase in the distance d separating two fixed points of the segments 11 and 12. Several different movements can thus be combined by arranging several wing segments in series in one and a same device, for example. Each part of the device will thus deploy at a different speed. The retracting means may be simple non-linear springs or more complex mechanical systems, for example involving triggering. Lift F on the wing may thus actuate a mechanical mechanism only when the lift exceeds a certain value. The movement occurs as illustrated in FIG. 2. It is not until the speed v exceeds a desired value that the system moves and produces a relatively abrupt increase in the distance d separating two fixed points of two adjacent segments of the wing.

A first exemplary embodiment is illustrated in FIGS. 3a to 3d in the form of an eagle positioned at the front of a motorbike. These Figures illustrate the positions that the device adopts as the motorbike gradually accelerates. In this case, the movements of the device can be broken down into four steps and have, for example, the following characteristics:

a) The eagle is at rest, with its wings furled.
b) The wings begin to open at 4±5 km/h.
c) An intermediate position, wings half deployed, at a speed of 55±5 km/h.
d) The wings are fully deployed at 70±5 km/h.

The transition from one position to another is smooth and without jerks. The device must naturally withstand a speed of at least 150 km/h (namely the maximum speed permissible in Switzerland, plus a margin of safety of 25%). In addition, the eagle can be operated by hand and it is possible to lock the wings in the open or closed position while the motorbike is stationary or in motion.

Figure 4:
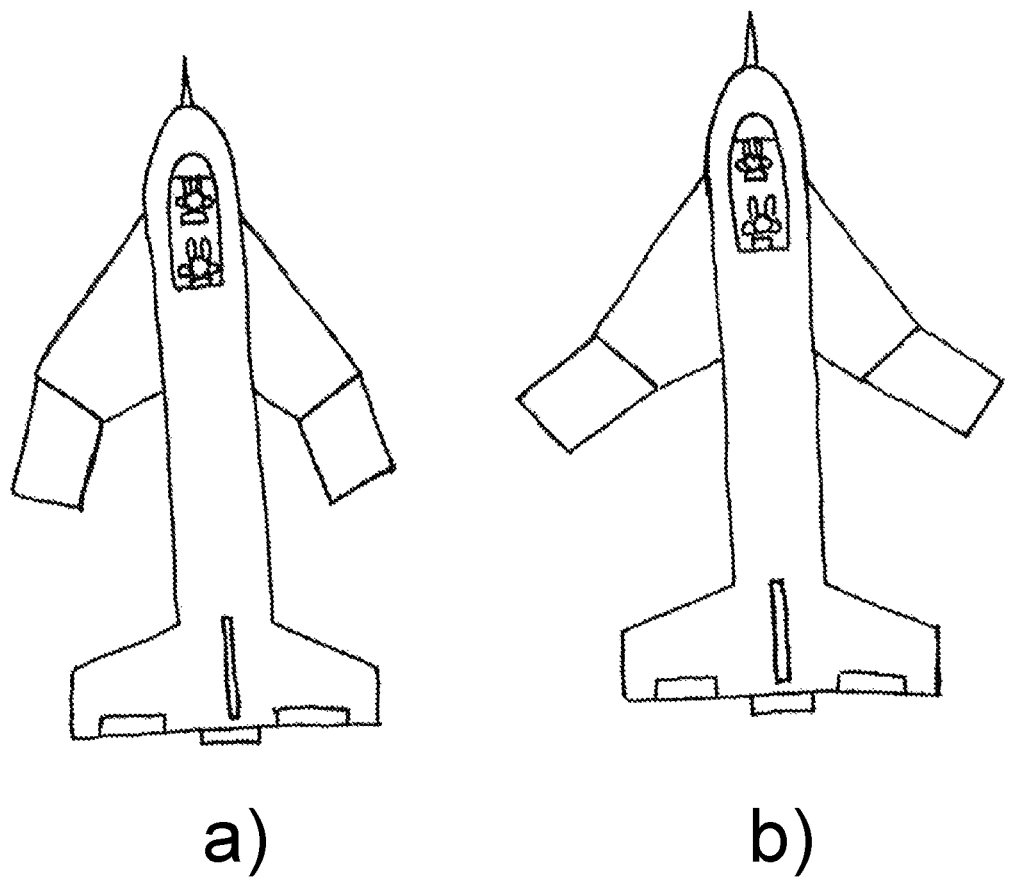
FIGS. 4a and 4b illustrate a second exemplary embodiment of the speed measuring device of the present invention in two particular positions of deployment.

A second exemplary embodiment is illustrated in FIGS. 4a and 4b in the form of an airplane. These Figures illustrate the positions that the device adopts according to the speed of the device. In this case, there are only two possible stable positions for example with the following characteristics:

a) The speed is higher than 100 km/h. The wings are retracted.
b) The speed is below 100 km/h. The wings are open.

Other Fields of Application

Automotive: it is possible to envisage systems and figurines which are well known in the automotive field and which are set in motion, and this at predetermined speeds.

Sailing: as in the automotive field, similar systems could be fitted to boats.

Aeronautical: likewise, such a device on the nose of an airplane could, for example indicate the speed required for takeoff and conversely, retract when the stall speed would be reached.

Other Alternative Forms

With due consideration of the fact that excessively protruding objects may be rejected by certain road-traffic, sailing or aeronautical authorities, devices made from soft materials could very well be produced on the same principle. They could, for example be fitted to children's bicycles in order to indicate to the children that their speed is too high.

Audible effects could also be envisaged, by causing a "whistling" as a result of the flow of air into dedicated cavities or tubes, this again being upward of or on reaching a defined speed.

Although the device of the invention is basically intended to be free of electronics, it might be possible to envisage creating several variants including an electronic part. It might be possible, for example, to use a battery powered by solar collectors to illuminate the device at night with colors that vary according to the speed.

In summary, the device of the invention transforms according to the speed reached by the vehicle, by changing shape at a determined speed. The aerodynamic forces generated by said vehicle are sufficient to cause at least one part of said device to move in such a way that the driver can see it and from that deduce the speed at which he is traveling, this being in both directions, namely when the vehicle either accelerates or decelerates.

The invention claimed is:

1. A mechanical device for measuring the relative speed of a vehicle in motion with respect to a fluidic medium, comprising:

at least one wing attached or articulated to a frontal zone of said vehicle at an attachment location, in the direction of travel of said vehicle, and in the fluidic medium in which said vehicle is evolving, which wing is designed to change shape as a function of the relative speed of said vehicle with respect to the fluidic medium, wherein said wing comprises at least two adjacent sections that are joined together by an articulation or flexing zone, wherein said wing is designed to occupy, between a non-deployed rest position and a completely deployed extreme service position, at least one intermediate position, wherein each intermediate position of said wing is determined by aerodynamic forces acting on said adjacent sections, and wherein said articulation or flexing zone is coupled to elastic retracting means designed to tend to return said wing toward said rest position when the relative speed of the vehicle with respect to the fluidic medium decreases.

2. The mechanical device as claimed in claim 1, wherein said wing is articulated so as to adopt a plurality of successive intermediate positions between the non-deployed rest position and the completely deployed extreme service position, wherein position changing thresholds between the successive intermediate positions each correspond to a predetermined and precalibrated relative speed of the vehicle with respect to the fluidic medium in which said mechanical device is intended to evolve.

3. The mechanical device as claimed in claim 1, wherein said articulation or flexing zone comprises a mechanical articulation arranged between said adjacent sections of the wing.

4. The mechanical device as claimed in claim 1, wherein said articulation or flexing zone comprises a more flexible zone arranged between said adjacent sections of the wing.

5. The mechanical device as claimed in claim 1, wherein said wing comprises a plurality of sections with one of said articulation or flexing zones arranged between each adjacent pairs of said plurality of sections of the wing.

6. The mechanical device as claimed in claim 5, wherein each articulation or flexing zone is coupled to the elastic retracting means.

7. The mechanical device as claimed in claim 1, comprising a plurality of wings, each one of said wings being attached or articulated to said attachment location which are common to said plurality of wings.

8. The mechanical device as claimed in claim 7, wherein each wing is designed for a particular range of relative speeds of the vehicle with respect to the fluidic medium.

9. The mechanical device as claimed in claim 7, wherein said wings are arranged in pairs which are symmetric about a longitudinal plane passing through a straight line corresponding to the mean forward trajectory of said vehicle.

10. The mechanical device as claimed in claim 1, further comprising at least one sensor sensing the change in position of one of said adjacent sections, said sensor being designed to communicate with control and/or display means.

11. A vehicle designed to travel in a fluidic medium, comprising at least one of the mechanical device as claimed in claim 10, and control and/or display means designed to process at least one information received from said sensor and convert it in order to communicate visual and/or audible information to a user of said vehicle.

12. A vehicle designed to travel in a fluidic medium, comprising at least one of the mechanical device as claimed in claim 1, said mechanical device being arranged in a frontal zone of said vehicle, in the direction of travel of said vehicle, and in the fluidic medium in which said vehicle evolves.

13. A mechanical device for measuring the relative speed of a vehicle in motion with respect to a fluidic medium, comprising:

at least one wing attached or articulated to a frontal zone of said vehicle at an attachment location, in the direction of travel of said vehicle, and in the fluidic medium in which said vehicle is evolving, which wing is designed to change shape as a function of the relative speed of said vehicle with respect to the fluidic medium, wherein said wing comprises at least two adjacent sections that are joined together by an articulation or flexing zone, wherein said wing is designed to occupy, between a non-deployed rest position and a completely deployed extreme service position, at least one intermediate position, wherein each intermediate position of said wing is determined by aerodynamic forces acting on said adjacent sections, and wherein said articulation or flexing zone is coupled to elastic retracting means designed to tend to return said wing toward said rest position when the relative speed of the vehicle with respect to the fluidic medium decreases;

wherein said wing comprises a plurality of sections with one of said articulation or flexing zones arranged between adjacent pairs of said plurality of sections of the wing; and wherein said articulation or flexing zones are arranged to allow the section furthest away from said attachment location to deploy at a relative speed that is lower than the relative speed of deployment of the section immediately adjacent to said attachment location.

14. A mechanical device for measuring the relative speed of a vehicle in motion with respect to a fluidic medium, comprising:

at least one wing attached or articulated to a frontal zone of said vehicle at an attachment location, in the direction of travel of said vehicle, and in the fluidic medium in which said vehicle is evolving, which wing is designed to change shape as a function of the relative speed of said vehicle with respect to the fluidic medium, wherein said wing comprises at least two adjacent sections that are joined together by an articulation or flexing zone, wherein said wing is designed to occupy, between a non-deployed rest position and a completely deployed extreme service position, at least one intermediate position, wherein each intermediate position of said wing is determined by aerodynamic forces acting on said adjacent sections, and wherein said articulation or flexing zone is coupled to elastic retracting means designed to tend to return said wing toward said rest position when the relative speed of the vehicle with respect to the fluidic medium decreases;

wherein said wing comprises a plurality of sections with one of said articulation or flexing zones arranged between adjacent pairs of said plurality of sections of the wing; and wherein said articulation or flexing zones are arranged to allow the section furthest away from said attachment location to deploy at a relative speed that is higher than the relative speed of deployment of the section immediately adjacent to said attachment location.

* * * * *

UNITED STATES PATENT AND TRADEMARK OFFICE
CERTIFICATE OF CORRECTION

PATENT NO. : 10,890,599 B2
APPLICATION NO. : 16/082406
DATED : January 12, 2021
INVENTOR(S) : Marc Thoma It is certified that error appears in the above-identified patent and that said Letters Patent is hereby corrected as shown below:

In the Specification

Column 1
- Line 42: "*(...) speed of a vehicle ion motion (...)*" should read "*(...) speed of a vehicle in motion (...)*"

Column 2
- Line 22: "*(...) flexing zone is couples to elastic retracting means (...)*" should read "*(...) flexing zone is coupled to elastic retracting means (...)*"
- Line 52: "*(...) and m the fluidic medium (...)*" should read "*(...) and in the fluidic medium (...)*"

Column 3
- Line 61: "*b) The wings begin to open at 4±5 km/h*" should read "*b) The wings begin to open at 40±5 km/h*"

Signed and Sealed this
Ninth Day of March, 2021

Drew Hirshfeld
*Performing the Functions and Duties of the
Under Secretary of Commerce for Intellectual Property and
Director of the United States Patent and Trademark Office*